Patented Aug. 7, 1951

2,563,376

UNITED STATES PATENT OFFICE 2,563,376

SUBSTITUTED AMINO ARYL ACETONITRILES

Leslie M. Schenck, Westfield, N. J., assignor to General Aniline & Film Corporation, New York, N. Y., a corporation of Delaware No Drawing. Application October 29, 1949, Serial No. 124,519

4 Claims. (Cl. 260—465)

This invention relates to new substituted amino aryl acetonitriles and methods for producing them.

In the past it has been known to produce m- or p-aminobenzoylacetonitrile and this has usually been done by a process involving a Friedel-Crafts reaction. The yields by this process have been quite low.

It is an object of the present invention to produce certain substituted amino aryl acetonitriles.

It is a further object of the present invention to produce certain substituted aminobenzoylacetonitriles by an improved process giving good yields.

These and other objects of the present invention are attained by the products of the process which comprises reacting a carbethoxyamino aryl chloride, substituted corresponding to the substitution of the product required, with ethylcyanoacetate and an enolizing agent and hydrolyzing the product.

The new compounds have the following general formula:

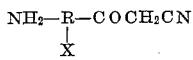

in which R is an aryl group such as phenyl or naphthyl, X is selected from the group consisting of alkyl, halogen, alkoxy, phenyl and phenoxy, and wherein the cyano aceto group is in the m- or p- positions to the amino group.

The following examples serve to illustrate preferred embodiments of the invention but substitutions and variations may be made within the scope of the appended claims.

Example I 100 parts 2-chloro-4-carbethoxyaminobenzoic acid is added to
200 parts thionyl chloride The mixture is refluxed until the evolution of hydrogen chloride ceases and the volatile solvent is then removed in vacuum. The residual acid chloride is dissolved in 340 parts benzene, and added during a period of one hour at a temperature below 5° C. to a mixture of
440 parts acetone
106 parts ethylcyanoacetate and
49 parts 95% sodium methylate.

After stirring several hours below 5° C. the solution is drowned in water and the product precipitated from the aqueous layer by the addition of acetic acid. The crude 2-chlor-4-carbethoxyaminobenzoylethylcyanoacetate is hydrolyzed by refluxing for ½ hour with a slight excess of 10% sodium hydroxide solution. Upon cooling, the 2-chlor-4-aminobenzoylacetonitrile is precipitated by slowly adding acetic acid. The product is a white crystalline material having a melting point of 169–170° C.

Example II

Following the method presented in Example I, 2,5 - dimethoxy - 4 - carbethoxyaminobenzoylchloride is reacted with ethylcyanoacetate and the product is hydrolyzed with dilute alkali to give 2,5-dimethoxy-4-aminobenzoylacetonitrile having a melting point of 168–171° C.

Example III

Following the method presented in Example I, 3-carbethoxyamino-4-chlorobenzoyl chloride is reacted with ethylcyanoacetate and the product hydrolyzed with dilute alkali to give 3-amino-4-chlorobenzoylacetonitrile having a melting point of 143–144° C.

Example IV

Following the method presented in Example I, 2-carbethoxyamino-5-chlorobenzoylchloride is reacted with ethylcyanoacetate and the product hydrolyzed with dilute alkali to give 2-amino-5-chlorobenzoylacetonitrile having a melting point of 110–112° C.

Example V

Following the method presented in Example I, 3-carbethoxyamino-4-phenoxybenzoylchloride is reacted with ethylcyanoacetate and the product hydrolyzed with dilute alkali to give 4-phenoxy-3-aminobenzoylacetonitrile having a melting point of 160° C.

Example VI

Following the method presented in Example I, 2-methyl-4-carbethoxyaminobenzoylchloride was reacted with ethylcyanoacetate and the product hydrolyzed with dilute alkali to give 2-methyl-4-aminobenzoylacetonitrile having a melting point of 154–160° C.

In the above examples, the acid chloride may be precipitated with petroleum ether instead of removing the volatile solvent. Furthermore, it is not necessary to dissolve the acid chloride in a solvent and add slowly to the other reactants since it is possible to mix them together. The hydrolysis step may be accomplished at a temperature lower than the reflux temperature. Alkaline reactants other than sodium hydroxide may be used for the hydrolysis. Other inert solvents may be substituted as may other enolizing agents such as other sodium alcoholates as will be apparent to those skilled in the art.

In the case of 2-chloro-4-aminobenzoylacetonitrile the reaction may be represented as follows:

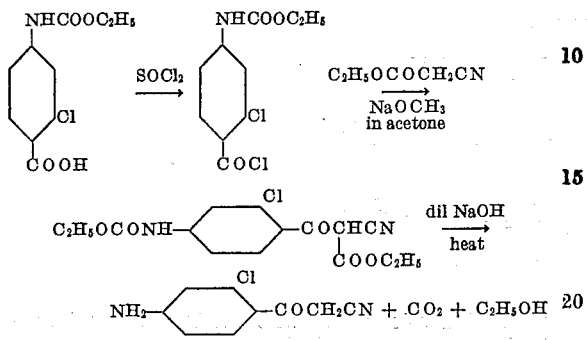

Additional compounds which have been produced by this process include 2-nitro-4-aminobenzoylacetonitrile, 4-phenyl-3-aminobenzoylacetonitrile, and 2-chlor-4-aminonaphthoylacetonitrile.

These compounds are useful as intermediates in preparing magenta color formers for color film.

I claim:
1. New compositions having the formula:

$$NH_2-R-COCH_2CN$$
$$|$$
$$X$$

in which R is an aryl group, X is selected from the group consisting of alkyl, halogen, alkoxy, phenyl and phenoxy, and wherein the cyano aceto group is in a position selected from the group consisting of meta and para to the amino group.
2. 2-chloro-4-aminobenzoylacetonitrile.
3. 4-phenoxy-3-aminobenzoylacetonitrile.
4. 2-methyl-4-aminobenzoylacetonitrile.

LESLIE M. SCHENCK.

REFERENCES CITED

The following references are of record in the file of this patent:

UNITED STATES PATENTS

| Number | Name | Date |
|---|---|---|
| 1,950,421 | Wahl | Mar. 13, 1934 |
| 2,392,167 | Long et al. | Jan. 1, 1946 |

OTHER REFERENCES

Dorsch et al., J. Am. Chem. Soc., vol. 54, pp. 2960–2964 (1932).

Long et al., J. Am. Chem. Soc., vol. 69, pp. 990–995 (1947).